United States Patent
Kim et al.

(10) Patent No.: US 12,001,378 B2
(45) Date of Patent: Jun. 4, 2024

(54) ELECTRONIC DEVICE FOR COMMUNICATING WITH EXTERNAL DEVICE THROUGH USB INTERFACE AND OPERATION METHOD THEREFOR

(71) Applicant: SAMSUNG ELECTRONICS CO., LTD., Suwon-si (KR)

(72) Inventors: Shinho Kim, Suwon-si (KR); Sangmin Hong, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/889,103

(22) Filed: Aug. 16, 2022

(65) Prior Publication Data

US 2023/0096038 A1    Mar. 30, 2023

Related U.S. Application Data

(63) Continuation of application No. PCT/KR2022/011794, filed on Aug. 8, 2022.

(30) Foreign Application Priority Data

Sep. 29, 2021   (KR) .................. 10-2021-0128506

(51) Int. Cl.
  *G06F 13/42*    (2006.01)
(52) U.S. Cl.
  CPC .. *G06F 13/4282* (2013.01); *G06F 2213/0042* (2013.01)
(58) Field of Classification Search
  CPC ............... G06F 13/4282; G06F 2213/0042
  See application file for complete search history.

(56) References Cited

U.S. PATENT DOCUMENTS 9,239,810 B2   1/2016 Chen et al.
9,836,420 B2   12/2017 Kang et al.
(Continued)

FOREIGN PATENT DOCUMENTS

KR    20150094506 A    8/2015

OTHER PUBLICATIONS

International Search Report with English Translation and Written Opinion for International Application No. PCT/KR2022/011794; International Filing Date Aug. 8, 2022; dated Nov. 10, 2022; 9 pages.

*Primary Examiner* — Henry Tsai
*Assistant Examiner* — Harry Z Wang
(74) *Attorney, Agent, or Firm* — CANTOR COLBURN LLP

(57) ABSTRACT

According to various embodiments, an electronic device may include an application processor including a first embedded universal serial bus (eUSB) device for performing an eUSB function, and a processor for controlling the first eUSB device. The electronic device may further include a repeater configured to be electrically connectable between the first eUSB device and an external device. The processor is configured to monitor to detect a connection of the external device to the electronic device. The processor is further configured to identify a mode related to an operation speed of the external device. The processor is further configured to control a signal to be transmitted or received in a high speed (HS) mode between the first eUSB device and the repeater, based on the identification that the mode is a full speed (FS) mode or a low speed (LS) mode. Various other embodiments may be provided.

20 Claims, 10 Drawing Sheets

(56) References Cited

U.S. PATENT DOCUMENTS

| | | | |
|---|---|---|---|
| 9,971,730 B2 | 5/2018 | Remple et al. | |
| 10,083,147 B2 | 9/2018 | Srivastava | |
| 10,891,242 B2 | 1/2021 | Wente et al. | |
| 2002/0095540 A1* | 7/2002 | Zolnowsky | G06F 13/4022 710/305 |
| 2002/0144031 A1* | 10/2002 | Garney | G06F 13/4059 710/60 |
| 2011/0208892 A1* | 8/2011 | Meyers | G06F 13/4226 710/313 |
| 2014/0003306 A1 | 1/2014 | Chen et al. | |
| 2014/0006674 A1* | 1/2014 | Chan | G06F 13/4221 710/313 |
| 2014/0156876 A1* | 6/2014 | Chan | G06F 1/3215 710/16 |
| 2015/0227489 A1* | 8/2015 | Chen | G06F 13/385 710/313 |
| 2016/0269126 A1 | 9/2016 | Maung et al. | |
| 2017/0006674 A1 | 1/2017 | Van Der Voort et al. | |
| 2017/0286360 A1 | 10/2017 | Srivastava | |
| 2018/0189222 A1 | 7/2018 | Srivastava | |
| 2019/0042521 A1 | 2/2019 | Chen et al. | |
| 2020/0257354 A1 | 8/2020 | Vining et al. | |
| 2020/0285602 A1 | 9/2020 | Maung et al. | |

* cited by examiner

ELECTRONIC DEVICE FOR COMMUNICATING WITH EXTERNAL DEVICE THROUGH USB INTERFACE AND OPERATION METHOD THEREFOR

CROSS-REFERENCE TO RELATED APPLICATION(S)

This application is based on and claims priority under 35 U.S.C. § 120 to PCT International Application No. PCT/KR2022/011794, which was filed on Aug. 8, 2022, and claims priority to Korean Patent Application No. 10-2021-0128506, filed on Sep. 29, 2021, in the Korean Intellectual Property Office, the disclosures of which are incorporated by reference herein their entirety.

TECHNICAL FIELD

Various embodiments relate to an electronic device for communication with an external device through a universal serial bus (USB) interface and an operation method therefor.

BACKGROUND ART

A universal serial bus 2.0 (USB2) protocol is an interface developed to standardize communication between a host computer and peripheral devices communicatively coupled to the host computer. The USB2 protocol is widely used in various applications, in addition to data communication between the host computer and the peripheral devices, for example, storage communication, Bluetooth communication, touch sensor communication, a camera, wireless fidelity (Wi-Fi), etc.

An embedded USB 2.0 (eUSB2), as an interface for supplementing the specifications of USB2, was designated through USB.org in 2014, and a specific type C (type-C) USB-based eUSB specification was released in 2018. The eUSB2 operates USB2 at a low voltage of substantially 1V or substantially 1.2V rather than substantially 3.3V, thereby increasing power efficiency and enhancing performance related to integration of a system-on-chip (SoC) process node and an interface controller.

DETAILED DESCRIPTION OF THE INVENTION

Technical Problem

The eUSB2 may support, as an operation related to an operation speed, high speed (HS), full speed (FS), and low speed (LS) modes supported in USB2, and to this end, an eUSB device supporting eUSB may include an HS mode transceiver and a single-ended FS/LS mode transceiver.

The eUSB device may communicate with an external device through a direct USB2 signal connection and may be connected to a USB2 device through a separate eUSB2 repeater. The eUSB2 repeater may not only convert the level of USB2 to a substantially 3.3V physical interface but also convert the single-ended eUSB2 FS/LS signal into a USB2 FS/LS signal. When a chip of an external device or a host having an eUSB2 interface is routed to a USB connector through the eUSB2 repeater, a USB2 connection at all speeds can be supported.

In a case of an electronic device to which an eUSB2 repeater is applied, even though an HS signal transmission or reception is possible between an eUSB device and an eUSB repeater, a signal between the eUSB device and the eUSB repeater also operates in an FS/LS mode corresponding to an operation mode of an external device if the external device not supporting eUSB2 is connected, which may lead to unnecessary power consumption.

Accordingly, in a case of the electronic device to which the eUSB2 repeater is applied, there is a need for a method for reducing power consumption and reducing the complexity of a circuit of the eUSB device by allowing an HS signal to be transmitted or received between the eUSB device and the eUSB repeater by using the HS mode transceiver, regardless of the operation speed of the external device.

Various embodiments of the disclosure provide a method for transmitting or receiving an HS signal between an eUSB device and an eUSB repeater, regardless of an operation speed of an external device, and an electronic device therefor, in a case of the electronic device to which an eUSB2 repeater is applied.

Technical problems to be solved by the disclosure are not limited to the technical problems mentioned above, and other technical problems that are not mentioned may be apparently understood from the description below by those skilled in the art to which the disclosure belongs.

Technical Solution

According to various embodiments, an electronic device includes: an application processor including a first embedded universal serial bus (eUSB) device configured to perform an eUSB function, and a processor configured to control the first eUSB device; and a repeater configured to be electrically connectable between the first eUSB device and an external device, wherein the processor is configured to monitor to detect a connection (e.g., coupling) of the external device to the electronic device, identify a mode related to an operation speed of the external device, and control a signal to be transmitted or received in a high speed (HS) mode between the first eUSB device and the repeater, based on the identification that the mode is a full speed (FS) mode or a low speed (LS) mode.

According to various embodiments, an operation method of an electronic device includes: monitoring to detect a connection of an external device to the electronic device; identifying a mode related to an operation speed of the external device; and based on identification that the mode is a full speed (FS) mode or a low speed (LS) mode, controlling a signal to be transmitted or received in a high speed (HS) mode between a first embedded USB (eUSB) device configured to perform an eUSB function and a repeater configured to be electrically connectable between the first eUSB device and the external device, the first eUSB device and the repeater being included in the electronic device.

According to various embodiments, a method includes: monitoring, by an electronic device, to detect a connection with an external device through an identification terminal included in a connector of an electronic device; receiving, from the external device, a signal having a pattern based on a specified protocol and a synchronous (SYNC) pattern; responsive to identifying that a mode of the external device is one of a full speed (FS) mode or a low speed (LS) mode, transmitting, from the electronic device to the external device, an end-of-packet pattern and a SYNC signal having a pattern corresponding to the mode of the external device; responsive to receiving a reset signal, configuring, by the electronic device, an operation mode of an embedded USB (eUSB) device to operate in the HS mode; converting, by the electronic device, a received HS mode signal to an FS mode signal or an LS mode signal based on the mode of the external device; and transmitting, by the electronic device, the FS mode signal or the LS mode signal to the external device Advantageous Effects According to various embodiments, in an electronic device, data is transmitted or received between an eUSB device and a USB repeater in an HS mode, and thus, a circuit included in the electronic device can be simplified.

According to various embodiments, in an electronic device, data is transmitted or received between an eUSB device and a USB repeater in an HS mode, and thus, unnecessary current consumption in the electronic device can be reduced.

Advantageous effects which can be achieved from the disclosure are not limited to the advantageous effects mentioned above, and other advantageous effects that are not mentioned may be apparently understood from the description below by those skilled in the art to which the disclosure belongs.

BRIEF DESCRIPTION OF DRAWINGS

With regard to the description of drawings, the same or similar reference numerals may be used to indicate the same or similar elements.

MODE FOR CARRYING OUT THE INVENTION

Figure 1:
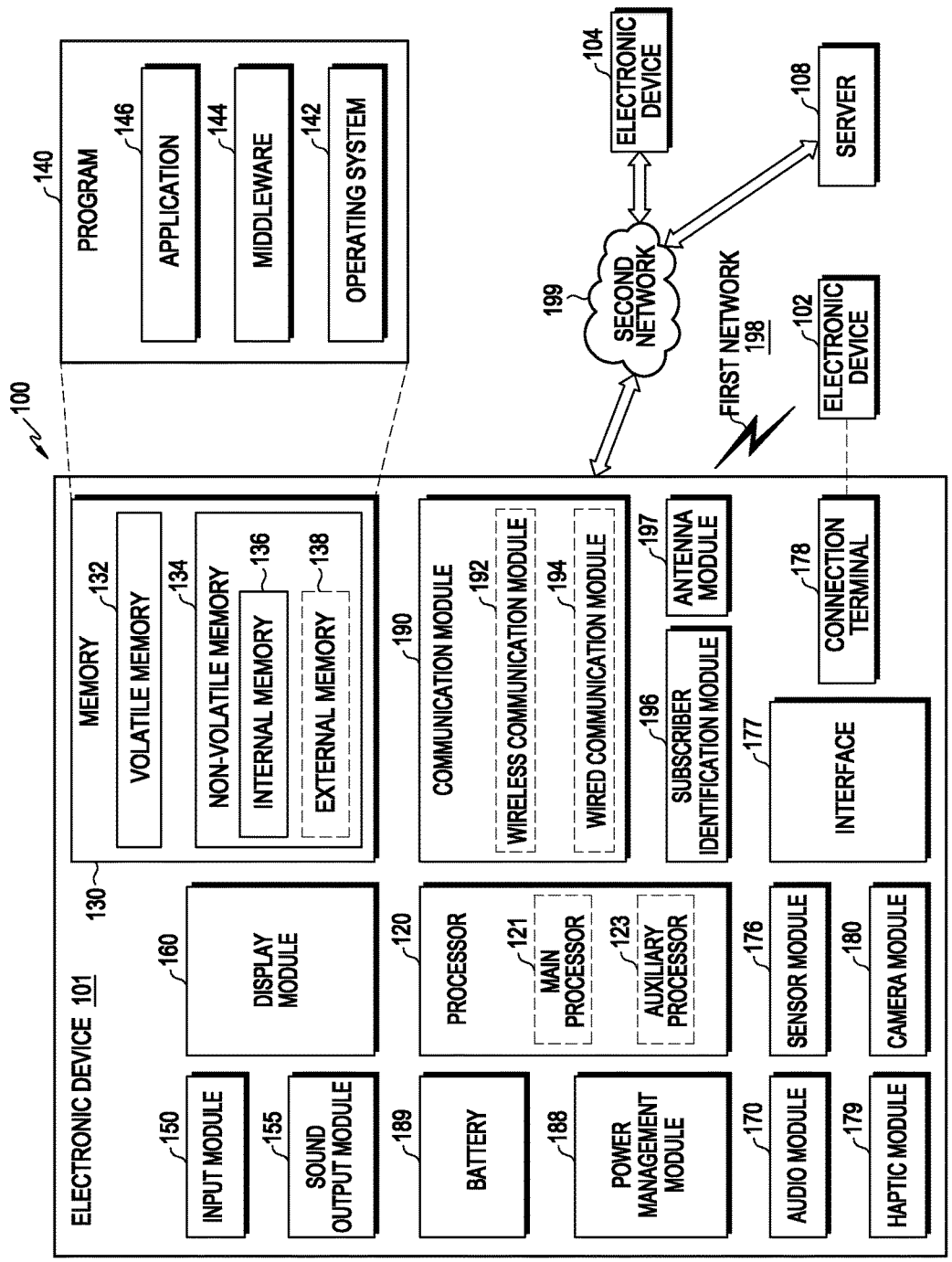
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
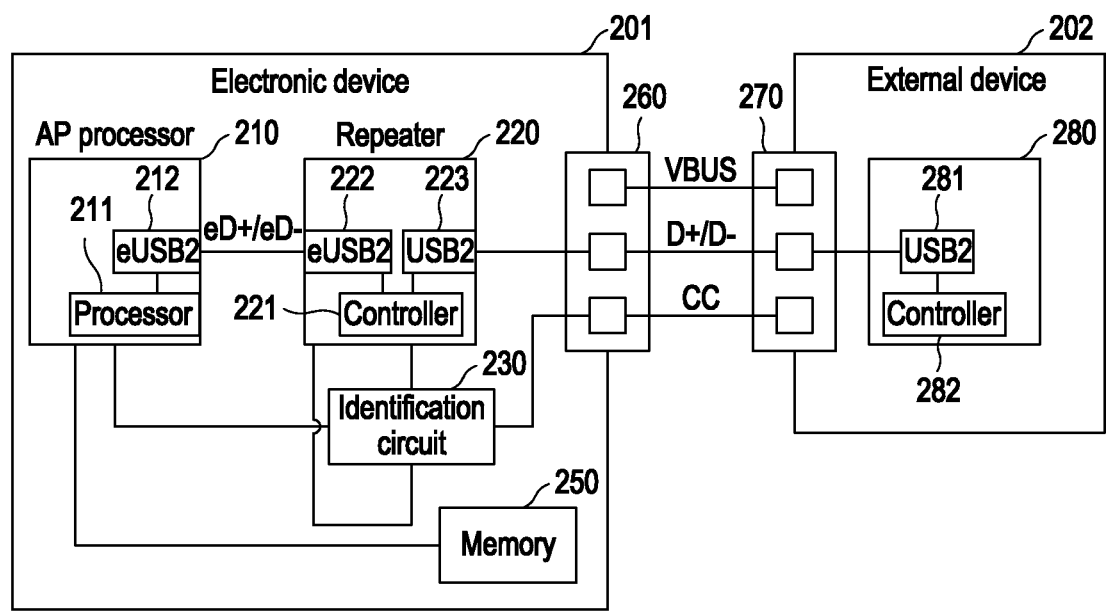
FIG. 2 is a block diagram illustrating the inside of an electronic device connected to an external device through a connector according to various embodiments.

FIG. 2 a block diagram illustrating the inside of an electronic device 201 connected to an external device 202 through a connector according to various embodiments.

Referring to FIG. 2, the electronic device 201 may include an application (AP) processor 210, a repeater 220, an identification circuit 230, a memory 250 (for example, the memory 130 of FIG. 1), and a connector 260 (for example, the connection terminal 178 of FIG. 1) capable of a connection with a connector 270 of the external device 202.

According to an embodiment, the external device 202 may include a USB device 280, and the USB device 280 may be configured to include a USB2 device 281 operating according to a USB2 protocol and a controller 282 for controlling the USB2 device 281.

According to an embodiment, the connectors 260 and 270 may transfer power to the inside or the outside of a device, and/or transfer analog or digital data. According to various embodiments, the connectors 260 and 270 may correspond to connectors supporting USB type C (type-C), and the electronic device 201 and the external device 202 may transfer data to each other through the USB type C connectors 260 and 270. According to various embodiments, the connectors 260 and 270 may be other than USB type C, such as USB type A, USB type B, and/or the like, including combinations and/or multiples thereof.

According to various embodiments, as the connector 270 of the external device 202 is connected through the connector 260, the electronic device 201 may recognize a physical connection of the external device 202. According to an embodiment, the electronic device 201 may recognize the connection of the external device 202 through the identification circuit 230 (for example, a configuration channel (CC) integrated circuit (IC)), based on a signal received through at least one of multiple signal pins included in the connector 260, for example, an identification terminal (e.g., a CC pin), and identify the external device 202. According to an embodiment, the electronic device 201 and/or the external device 202 connected through the USB type C connector may determine the roles of the electronic device 201 and the external device 202 based on information recognized through the CC pin. According to an embodiment, in the perspective of data transmission, the electronic device 201 and/or the external device 202 may determine whether to operate as a host device or a client device. That is, when the electronic device 201 is a host device, the external device 202 may be referred to as a client device, and vice versa. In addition, the external device 202 may be referred to as an accessory device accessible through the connector 260 of the electronic device 201. For example, when the external device 202 is an audio output device, the external device 202 may correspond to a speaker, a headphone, or an earphone.

According to an embodiment, before the connector 270 of the external device 202 is connected through the connector 260 of the electronic device 201, high and low signals (e.g., 0V or VCC voltage) may be detected in the form of a toggle according to a pull-up (Rp)/pull-down (Rd) resistor (Rp or Rd) connected to the identification terminal of the electronic device 201. When the connector 270 of the external device 202 is connected through the connector 260 of the electronic device 201, a high signal may be detected from one device through the identification terminal of the electronic device 201, and a low signal may be detected from the other device. According to an embodiment, until the connector 260 and the connector 270 are connected, the high or low signal may be output in the form of the toggle, and after the connection, the electronic device 201 operating as a host may maintain a low voltage level through the CC pin, and the external device 202 operating as a client may maintain a low voltage level. This state may be maintained until detachment. When the connector 270 is detached from the connector 260, the signal may be detected again in the toggle form in which the high signal and the low signal repeat.

The AP processor 210 may be configured to include a processor 211 (for example, the processor 120 of FIG. 1) and an eUSB2 device 212. The AP processor 210 may control an operation of the electronic device 201 and/or a signal flow between blocks of the electronic device 201, and may perform a data processing function of processing data. The AP processor 210 may be formed as a single core processor or a multi-core processor.

The memory 250 may be electrically connected to the AP processor 210, and may store various information and programs for data transmission or reception according to various embodiments. For example, the program may include a routine of detecting a connection of the external device 202 through the connector 260, a routine of identifying the type of the external device 202 during the connection of the external device 202, a routine of making a setting to perform all operations corresponding to the identified external device 202, etc.

The eUSB device 212 may perform an operation according to an eUSB2 protocol, and may be configured as a system on chip (SoC) having logic. The eUSB2 device 212 may transmit and/or receives a signal to or from the repeater 220 in an HS mode, based the eUSB2 protocol. The eUSB device 212 may receive a synchronous (SYNC) signal of the external device 202 through the repeater 220, and identify whether the operation mode of the external device 202 is an HS mode or an FS/LS mode. The SYNC signals having different patterns are transmitted according to the operation mode of the external device 202, and accordingly, the electronic device 201 may determine the operation mode of the external device 202, based on the pattern of the SYNC signal received from the external device 202. When the external device 202 is determined to operate in the HS mode, the eUSB device 212 may operate according to the eUSB2 specification, and when the external device 202 is determined to operate in the FS mode or the LS mode, a specified operation mode (speed mode) may be configured while a repeated exchange of an end-of-packet (EOP) pattern and the SYNC signal of the pattern corresponding to the operation mode of the external device 202 is performed through an HS transceiver (e.g., an HS transceiver 330 of FIG. 3B) of the eUSB device 212. For example, when the external device 202 operates in the FS mode, in a case of eD−, the toggle signal is transmitted as the SYNC signal according to a determined pattern while eD+ remains a predetermined voltage, and when the external device 202 operates in the LS mode, in a case of eD+, the toggle signal is transmitted as the SYNC signal according to a determined pattern while eD− remains a predetermined voltage.

The eUSB device 212 may transmit a control message for operating the eUSB2 device 222 of the repeater 220 in the HS mode, and may configure the operation mode of the eUSB device 212 as the HS mode. For example, for the control message, a CM.reset message according to the eUSB2 specification may be used.

The eUSB device 212 may transmit and/or receives the FS/LS mode signal to or from the external device 202 through the repeater 220 after the operation mode has is completed to be configured as the HS mode.

The repeater 220 may include an eUSB2 device 222, a USB2 device 223, and a controller 221 for controlling the eUSB2 device 222 and the USB2 device 223, and may perform conversion between an eUSB2 protocol signal and a USB2 protocol signal. According to an embodiment, the repeater 220 may convert an HS mode data signal (eD+/eD−) of the eUSB2, received from the eUSB device 212, into an FS/LS mode data signal (D+/D−) following a USB2 protocol, and output the converted signal to the external device 202 through the connector 260. According to an embodiment, the repeater 220 may convert the USB2 FS/LS mode data signal (D+/D−) received from the external device 202 through the connector 260 into the eUSB2 HS mode data signal (eD+/eD−), and transfer the converted signal to the eUSB device 212.

The repeater 220 may exchange a signal having a pattern based on the specified protocol and a synchronous (SYNC) pattern with the external device 202. According to an embodiment, the signal input from the external device 202 may be transferred to the eUSB device 212 through the repeater 220. Different patterns of signals may be transmitted according to the operation mode of the external device 202.

When the external device 202 is determined to operate in the HS mode, the electronic device 201 may operate according to the eUSB2 specification, and when the operation mode of the external device 202 is the FS/LS mode, an end-of-packet (EOP) signal and a signal having a pattern corresponding to the operation mode of the external device 202 may be received through the eUSB device 212, and the received signals may be transferred to the external device 202. For example, when the external device 202 operates in the FS mode, in a case of eD−, the toggle signal may be transmitted as a signal according to a determined pattern while eD+ remains a predetermined voltage, and when the external device 202 operates in the LS mode, in a case of eD+, the toggle signal may be transmitted as a signal according to a determined pattern while eD− remains a predetermined voltage.

According to an embodiment, the signal output from the eUSB device 212 may be input to the eUSB2 device 222 of the repeater 220, and the repeater 220 may transfer the signal received through the eUSB2 device 222 to the external 202 through the USB2 device 223 of the repeater 220, and may receive the signal received from the external device 202 through the USB2 device 223 and transfer the received signal to the eUSB device 212.

The repeater 220 may receive a control message transmitted from the eUSB device 212 through the eUSB2 device 222. For example, for the control message, a CM.reset message may be used according to the eUSB2 specification. After receiving the CM.reset message, the eUSB2 device 222 of the repeater 220 may be reconfigured to operate in the HS mode. According to an embodiment, the operation mode of the USB2 device 223 of the repeater 220 may be maintained in the same manner as the operation mode of the external device 202.

After the operation mode is completed to be configured as the HS mode, the repeater 220 may receive the HS mode signal received from the eUSB device 212 from the eUSB2 device 222 of the repeater 220, transfer corresponding data to the USB2 device 223, based on the USB transceiver microcell interface (UTMI)+ protocol, and control the controller 221 to change the corresponding data according to the FS/LS mode. The repeater 220 may transmit the converted FS/LS mode signal to the external device 202 through the USB2 device 223.

According to various embodiments, the eUSB device 212, the repeater 220, the identification circuit 230, and the processor 211 may be implemented as one IC chip, and at least some of the components above may be configured as a separate IC chip.

According to various embodiments, the electronic device 201 may include a processor (e.g., the processor 211) and a memory 250 electrically connected to the processor, wherein the memory 250 may store instructions which, when executed, cause the processor to monitor the connection with the external device 202, through the identification terminal, and provide for a signal to be transmitted and/or received between the USB device 212 and the repeater 220 in the HS mode when determination that the external device 202 is connected and operates in the FS/LS mode is made.

According to various embodiments, the instructions may be configured to cause the processor to detect the connection with the external device 202 through the identification terminal included in the connector and then identify whether a low or high signal according to toggling is detected while the signal is fixed as the low or high signal, so as to monitor the connection with the external device 202.

According to various embodiments, the instructions may be configured to cause the processor to receive a signal input from the external device 202 and identify whether the operation mode of the external device 202 is the HS mode or the FS/LS mode.

According to various embodiments, the instructions may be configured to cause the processor to identify whether the operation mode of the external device 202 is the FS/LS mode, and transmit the end-of-packet (EOP) signal and the SYNC signal having a pattern corresponding to the operation mode of the external device 202.

According to various embodiments, the instructions may be configured to cause the processor to transmit a control message for allowing the eUSB device 212 and the eUSB2 device 222 of the repeater 220 to operate in the HS mode, configure the operation modes of the eUSB device 212 and the eUSB2 device 222 of the repeater 220 as the HS mode, and then allow the signal to be transmitted or received between the eUSB device 212 and the repeater 220 in the HS mode.

According to various embodiments, at least some of the operations of the electronic device may be implemented as instructions stored in a storage medium in the form of a program module (e.g., firmware).

In the description above, a case where an entity for performing a control to monitor the connection with the external device 202 and allow a signal to be transmitted or received between the eUSB device 212 and the repeater 220 in the electronic device 201 in the HS mode when the operation mode of the external device 202 is the FS/LS mode is a processor 211 is described as an example, but the entity for controlling the operation may be a controller (not shown) included in the eUSB device 212, rather than the processor 211.

Figure 3A:
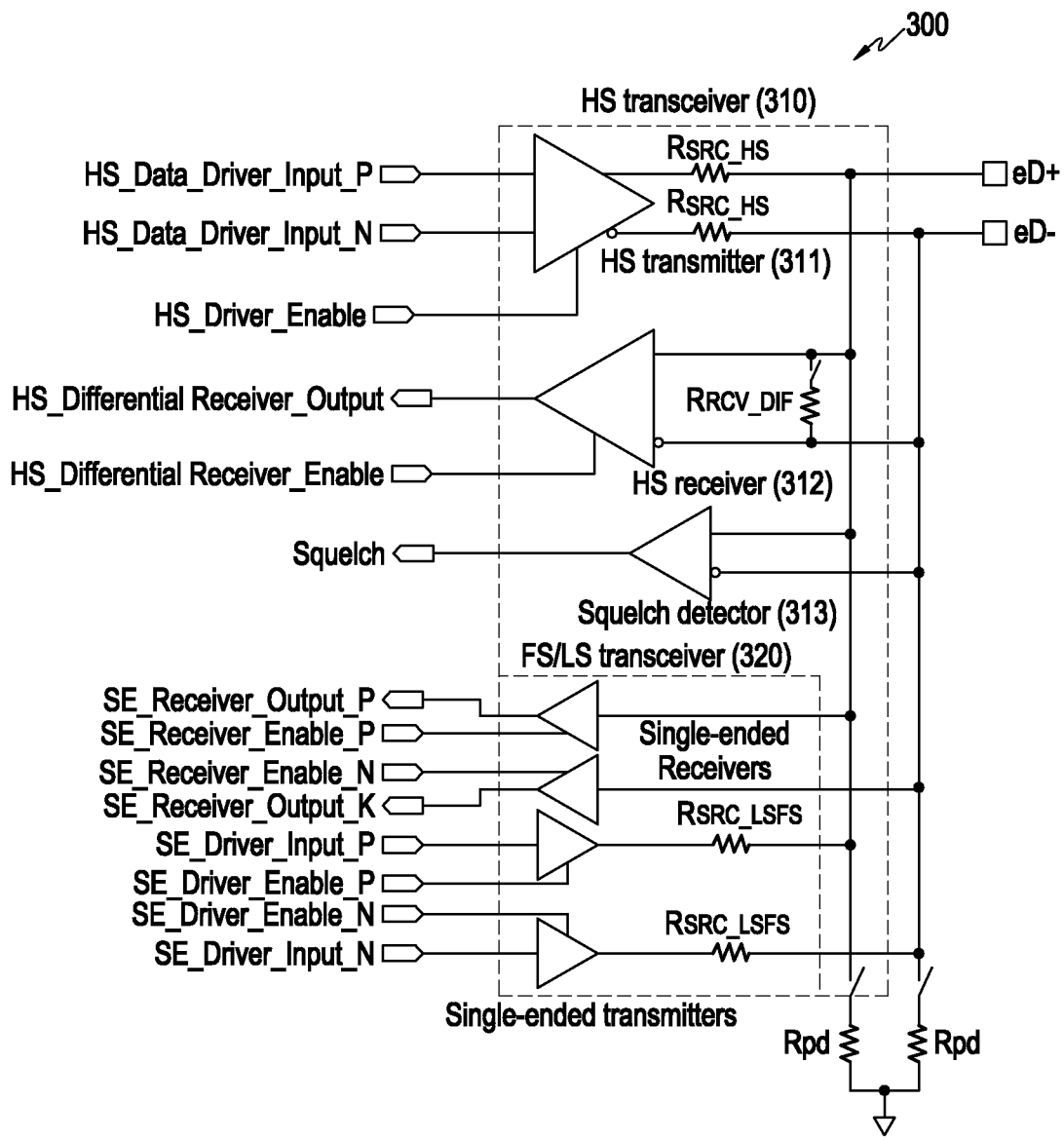
FIG. 3A illustrates configuration of a physical circuit of a normal eUSB2 device specified in the eUSB2 specification.

FIG. 3A illustrates configuration of a physical circuit 300 of a normal eUSB2 device specified in the eUSB2 specification.

Referring to FIG. 3A, the physical circuit 300 of the normal eUSB2 device may be configured to include an HS transceiver 310 for transmitting and/or receiving a signal in an HS mode, an FS/LS transceiver 320 for transmitting and/or receiving a signal in an FS mode/LS mode, and a pull-up/pull-down resistor (Rpd).

According to an embodiment, the HS transceiver 310 may be configured to include an HS transmitter 311 for transmitting an HS mode signal, an HS receiver 312 for receiving an HS mode signal, and a squelch detector 313 for determining the validity of a received signal.

According to the content specified in the eUSB2 specification, when an external device (e.g., the external device 202) connected to an electronic device (e.g., the electronic device 201) operates in the HS mode, the HS transceiver 310 may operate upon a control of a processor, and when external device operates in the FS/LS mode, the FS/LS transceiver 310 may operate upon a control of the processor.

In the eUSB2 specification, when the external device operates in the FS/LS mode, it is specified that the eUSB2 device and a repeater transmit and/or receive a signal to or from each other in the FS/LS mode according to a USB2 protocol, instead of transmitting and/or receiving the signal in the HS mode according to the eUSB2 protocol. The eUSB2 device and the repeater may be configured to transmit and/or receive a signal to or from each other in the HS mode according to the eUSB2 protocol, regardless of the operation speed of the external device. In this case, in the configuration of the circuit 300 of the eUSB device in the AP processor and the eUSB2 device in the repeater of FIG. 3A, the FS/LS transceiver 320 does not need to operate, and thus, the configuration of the circuit 300 can be simplified through omission of the FS/LS transceiver 320.

Figure 3B:
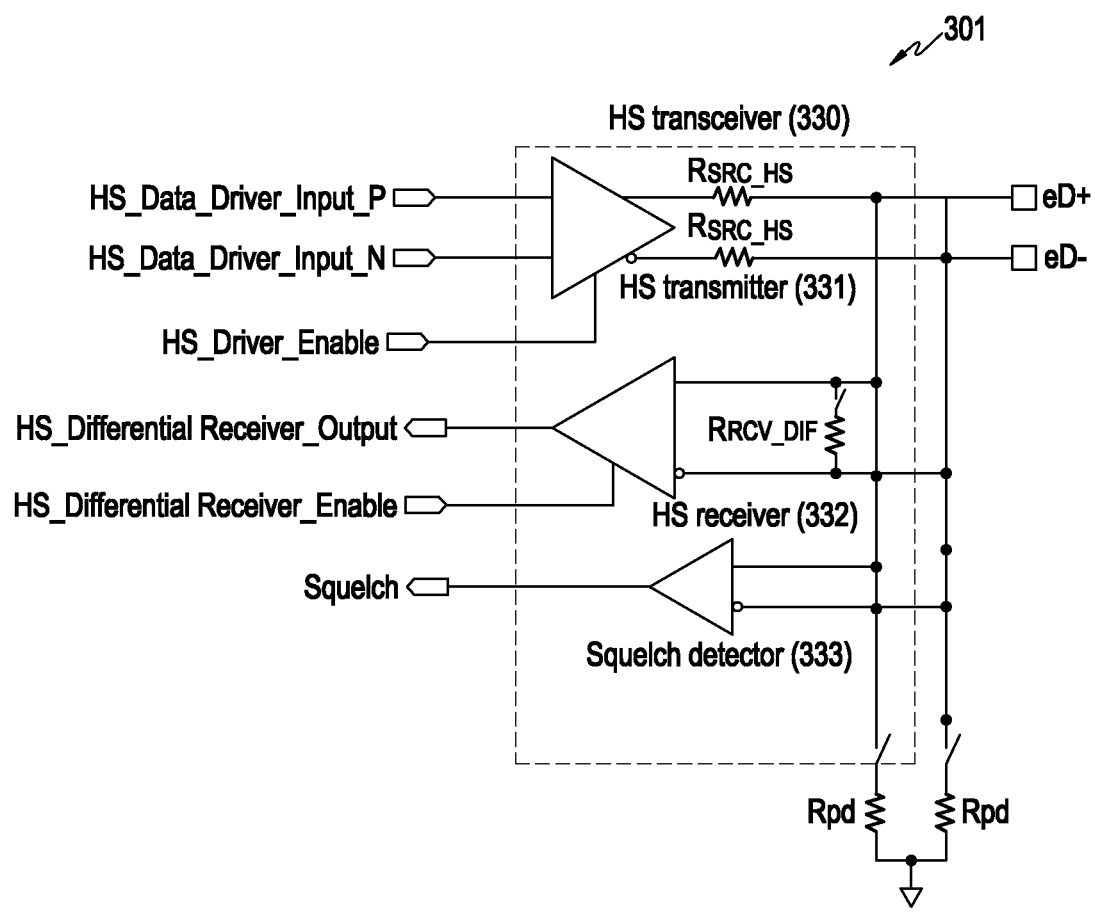
FIG. 3B illustrates configuration of a circuit of an eUSB2 device in a repeater and an eUSB device included in an application (AP) processor from which an FS/LS transceiver 320 is omitted according to an embodiment.

FIG. 3B illustrates configuration of a circuit 301 of an eUSB device 212 and an eUSB2 device 222 in a repeater 220 according to an embodiment.

Referring to FIG. 3B, the eUSB device 212 and the eUSB2 device 222 in the repeater 220 according to an embodiment may be configured not to include the FS/LS transceiver 320 of FIG. 3A and to include an HS transceiver 330 for transmitting or receiving an HS mode signal, and a pull-up/pull-down resistor (Rpd).

According to an embodiment, the HS transceiver 330 may be configured to include an HS transceiver 331, an HS receiver 332, and a squelch detector 333. According to an embodiment, even though the external device transmits and/or receives a signal in the FS/LS mode, the eUSB device of the AP processor and the eUSB2 device of the repeater may operate to transmit and/or receive the HS signal through the HS transceiver 330 upon a control of the processor. The USB2 device of the repeater is configured as shown in FIG. 3A, and thus, the signal output from the USB2 device of the repeater to the external device may be transmitted in the HS mode or the FS/LS mode according to the operation mode of the external device.

Figure 4:
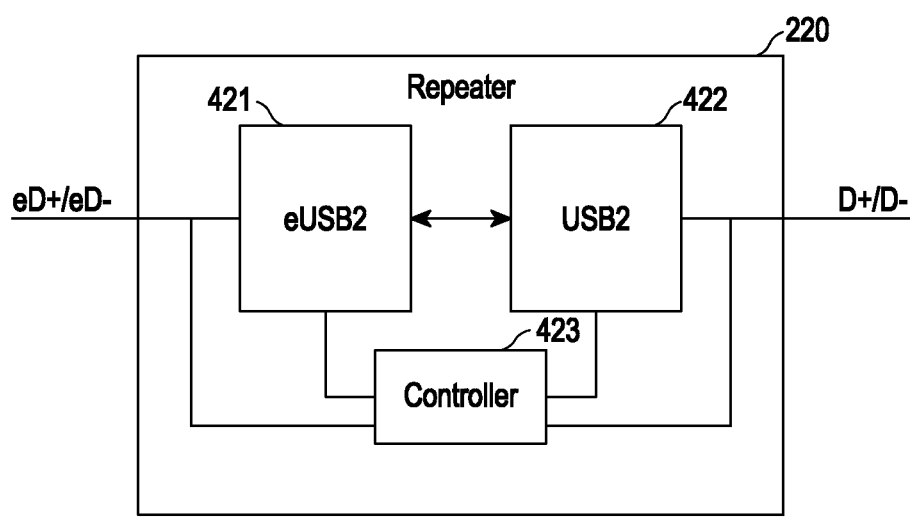
FIG. 4 illustrates configuration of a USB repeater of an electronic device according to various embodiments.

FIG. 4 illustrates configuration of a repeater 220 of an electronic device (e.g., the electronic device 201) according to various embodiments.

Referring to FIG. 4, a repeater 220 may be configured to include an eUSB2 device 421, a USB2 device 422, and a controller 423.

The eUSB2 device 421 may be communicatively coupled to a data line (eD+/eD−) connected to an eUSB device (e.g., the eUSB device 212 of FIG. 2), and may support an eUSB2 protocol. According to an embodiment, a circuit of the eUSB2 device 421 may be configured not to include an FS/LS transceiver as shown in FIG. 3B, and to include an HS transceiver and a pull-up/pull-down resistor.

The USB2 device 422 may be communicatively coupled to a data line (D+/D−) connected to the external device, and may support a USB2 protocol.

The controller 423 may control the operations of the eUSB2 device 421 and the USB2 device 422 according to a control signal input from the eUSB device 212 through the data line (eD+/eD−). According to an embodiment, the controller 423 may configure the operation mode of the eUSB2 device 421 as an HS mode, based on a protocol message input from the eUSB device 212, and may control the eUSB2 device 421 to convert the HS mode signal input through the eUSB2 device 421 into the FS/LS mode corresponding to the operation mode of the external device. According to an embodiment, the controller 423 may convert the FS/LS mode signal input from the external device through the USB2 device 422 into the HS mode signal to transmit the converted signal to the eUSB2 device 212 through the eUSB2 device 421.

According to an embodiment, the eUSB2 device 421 and the USB2 device 422 may be configured to transmit and/or receive a signal, based on a UTMI+ protocol. According to an embodiment, based on the UTMI+ protocol, according to a control of the controller 423, an eUSB2 signal received from the eUSB2 device 421 may be converted into a USB2 signal and transferred to the USB2 device 422, and a USB2 signal received from the USB2 device 422 may be converted into an eUSB2 signal and transferred to the eUSB2 device 421.

According to various embodiments, an electronic device 201 includes: an application processor including a first embedded universal serial bus (eUSB) device configured to perform an eUSB function, and a processor configured to control the first eUSB device; and a repeater configured to be electrically connectable between the first eUSB device and an external device, wherein the processor is configured to monitor to detect a connection of the external device to the electronic device, identify a mode related to an operation speed of the external device, and control a signal to be transmitted or received in a high speed (HS) mode between the first eUSB device and the repeater, based on the identification that the mode is a full speed (FS) mode or a low speed (LS) mode.

According to various embodiments, the repeater includes a second eUSB device connected to the first eUSB device, and a USB device configured to be connectable to the external device, wherein the processor is configured to allow a signal to be transmitted and/or received between the first eUSB device and the second eUSB device in the HS mode, and allow a signal to be transmitted and/or received between the USB device and the external device in the identified FS mode or LS mode.

According to various embodiments, the processor may be configured to convert an HS mode signal transmitted from the first eUSB device to the repeater into a signal of the identified FS mode or LS mode, so as to transmit the same to the external device, and control the repeater to convert a signal received from the external device into the HS mode signal, so as to transfer the same to the first eUSB device, based on the identified FS mode or LS mode.

According to various embodiments, the processor may be configured to control the repeater to, based on a USB transceiver microcell interface (UTMI)+ protocol, convert the HS mode signal transmitted from the first eUSB device to the repeater into a signal of the identified FS mode or LS mode, and convert the signal of the FS mode or LS mode, received from the external device, into the HS mode signal so as to transfer the same to the first eUSB device.

According to various embodiments, the USB device may include a first transceiver configured to transmit and/or receive the signal of the FS mode or the LS mode, and a second transceiver configured to transmit and/or receive the HS mode signal, wherein each of the first eUSB device and the second eUSB device is configured not to include the first transceiver and is configured to include the second transceiver.

According to various embodiments, the processor may be configured to transmit, to the external device from the first eUSB device through the repeater, a synchronous signal corresponding to the identified FS mode or LS mode, based on the identification that the mode is the FS mode or the LS mode.

According to various embodiments, the processor may be configured to transmit, to the external device from the first eUSB device through the repeater, a synchronous signal corresponding to the identified FS mode or LS mode by using the second transceiver.

According to various embodiments, the processor may be configured to identify a mode related to an operation speed of the external device, based on a pattern of a synchronous signal received from the external device.

According to various embodiments, the processor may be configured to transmit a predetermined control message to the first eUSB and the repeater to allow a signal to be transmitted or received between the first eUSB device and the repeater in the HS mode, based on the identification that the mode is an FS mode or an LS mode.

According to various embodiments, the HS mode may correspond to a mode of transmitting data during a first interval in which data is transmitted, and operating in a power saving mode during an interval remaining after excluding the first interval.

Figure 5:
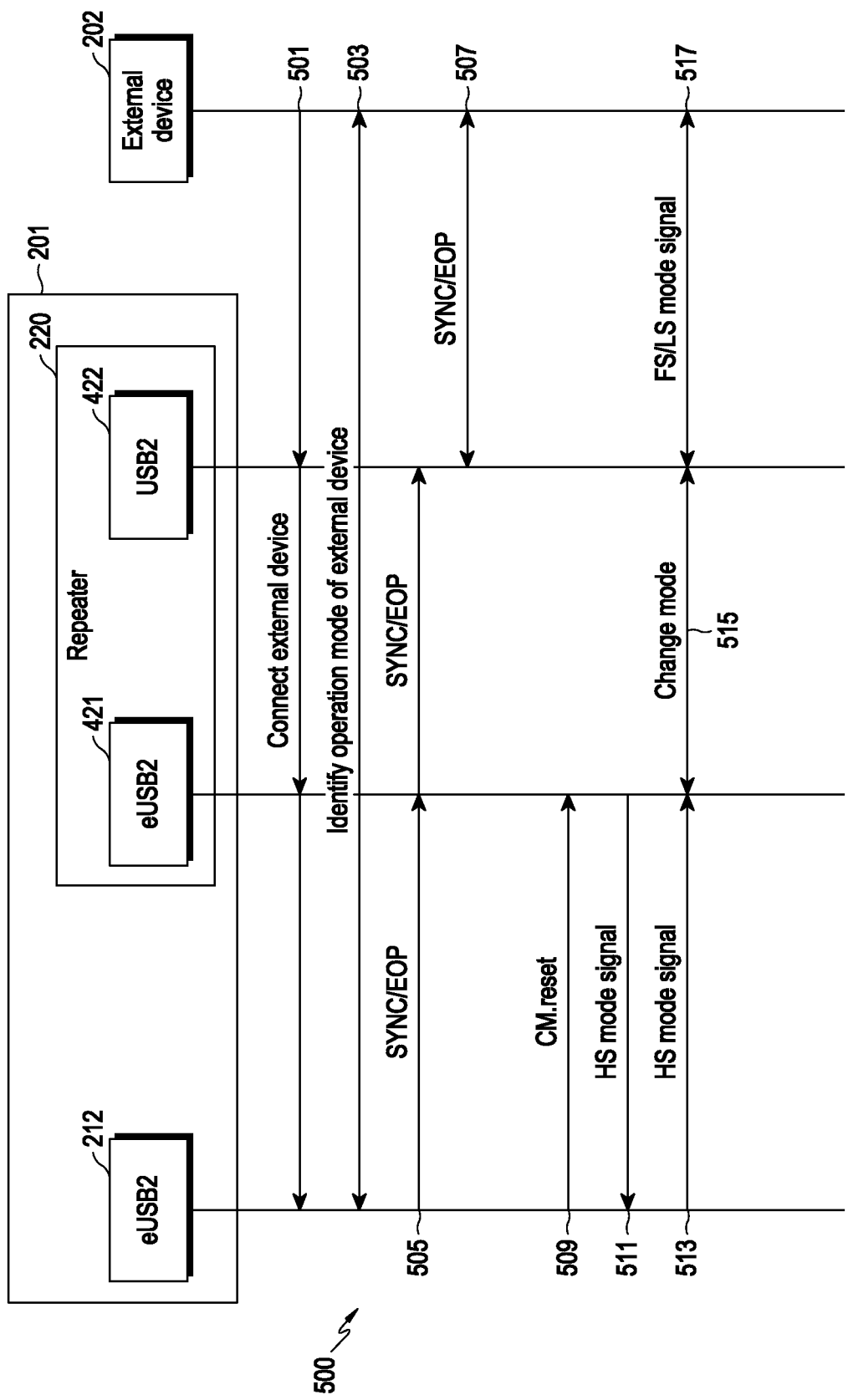
FIG. 5 is a flowchart illustrating a method of operation in an electronic device according to various embodiments.

FIG. 5 is a flowchart illustrating a method 500 of operation in an electronic device (e.g., the electronic device 201) according to various embodiments.

Referring to FIG. 5, the method 500 may include operations 501 to 517. Each operation of the method 500 of FIG. 5 may be performed by control of a controller (not shown) included in an electronic device (e.g., the electronic device 101 of FIG. 1 and the electronic device 201 of FIG. 2), at least one processor (e.g., at least one of the processor 120 of FIG. 1 or the processor 211 of FIG. 2) of the electronic device, or an eUSB device (e.g., 212 of FIG. 2), and a controller 423 included in a repeater (e.g., 220 of FIGS. 2 and 4).

In operation 501, the electronic device 201 may monitor to detect a connection with an external device 202 through an identification terminal included in a connector of the electronic device 201. According to an embodiment, after the detection of the connection with the external device 202, the electronic device 201 may identify whether a high or low signal according to toggling is detected in a state in which the high or low signal is fixed, so as to monitor the connection with the external device 202.

In operation 503, the electronic device 201 may receive a signal having a pattern based on a specified protocol and a synchronous (SYNC) pattern, input from the external device 202, so as to identify whether the operation mode of the external device 202 is an HS mode or an FS/LS mode. According to an embodiment, the signal input from the external device 202 may be transferred to the eUSB device 212 through the repeater 220. Different patterns of signals are transmitted according to the operation mode of the external device 202, and the electronic device 201 may determine the operation mode of the external device 202, based on the pattern of the signal received from the external device 202.

When the external device 202 is determined to operate in the HS mode, the electronic device 201 may operate according to the eUSB2 specification, and accordingly, hereinafter, exemplary embodiments of the disclosure are described under the assumption that the external device 202 operates in the FS mode or the LS mode.

In operation 505, the electronic device 201 having identified that the operation mode of the external mode 202 is the FS/LS mode may be configured in a specified operation mode (speed mode) while a repeated exchange of an end-of-packet (EOP) pattern and a SYNC signal having a pattern corresponding to the operation mode of the external device 202 is performed through an HS transceiver (e.g., an HS transceiver 330 of FIG. 3B) of the eUSB device 212. For example, when the external device 202 operates in the FS mode, in a case of eD−, the toggle signal is transmitted as the SYNC signal according to a determined pattern while eD+ remains a predetermined voltage, and when the external device 202 operates in the LS mode, in a case of eD+, the toggle signal is transmitted as the SYNC signal according to a determined pattern while eD− remains a predetermined voltage.

According to an embodiment, the signal output from the HS transceiver (e.g., the HS transceiver 330 of FIG. 3B) of the eUSB device 212 may be input to the eUSB2 device 421 of the repeater 220 and transferred to the USB2 device 422 of the repeater 220 through the HS transceiver (e.g., the HS transceiver 330 of FIG. 3B) of the eUSB2 device 421.

In operation 507, the electronic device 201 may transfer, to the external device 202, the signal transmitted in the FS/LS mode through the FS/LS transceiver (e.g., the FS/LS transceiver 320 of FIG. 3A) of the eUSB2 device 421 of the repeater 220, and receive the signal received from the external device 202. According to an embodiment, the signal may include a synchronous pattern, a start-of-packet (SOP)/EOP, etc. determined according to a protocol specification for each operation mode (speed mode) according to each USB operation speed.

In operation 509, the electronic device 201 may transmit a control message for operating in the HS mode from the eUSB device 212 to the eUSB2 device 421 of the repeater 220. For example, for the control message, a CM.reset message may be used according the eUSB2 specification. After transmitting the CM.reset message, the electronic device 201 may configure the operation mode of the eUSB device 212 and the eUSB2 device 421 of the repeater 220 in the HS mode. According to an embodiment, the operation mode of the USB2 device 422 of the repeater 220 may be maintained in the same manner as the operation mode of the external device 202.

In operation 511, after the completion of configuring the operation mode as the HS mode, the HS mode signal may be transmitted from the eUSB2 device 421 of the repeater 220 to the eUSB device 212.

In operations 513 to 517, the electronic device 201 may transmit and/or receives the FS/LS mode signal to or from the external device 202. Specifically, in operation 513, the eUSB device 212 may transmit the signal in the HS mode to the eUSB2 device 421. In operation 515, the repeater 220 may convert the HS mode signal input to the eUSB2 device 421 into the FS/LS mode, based on the UTMI+ protocol, and transmit the converted signal to the USB2 device 422. In operation 517, the repeater 220 may transmit the converted FS/LS mode signal from the USB2 device 422 to the external device 202.

Figure 6:
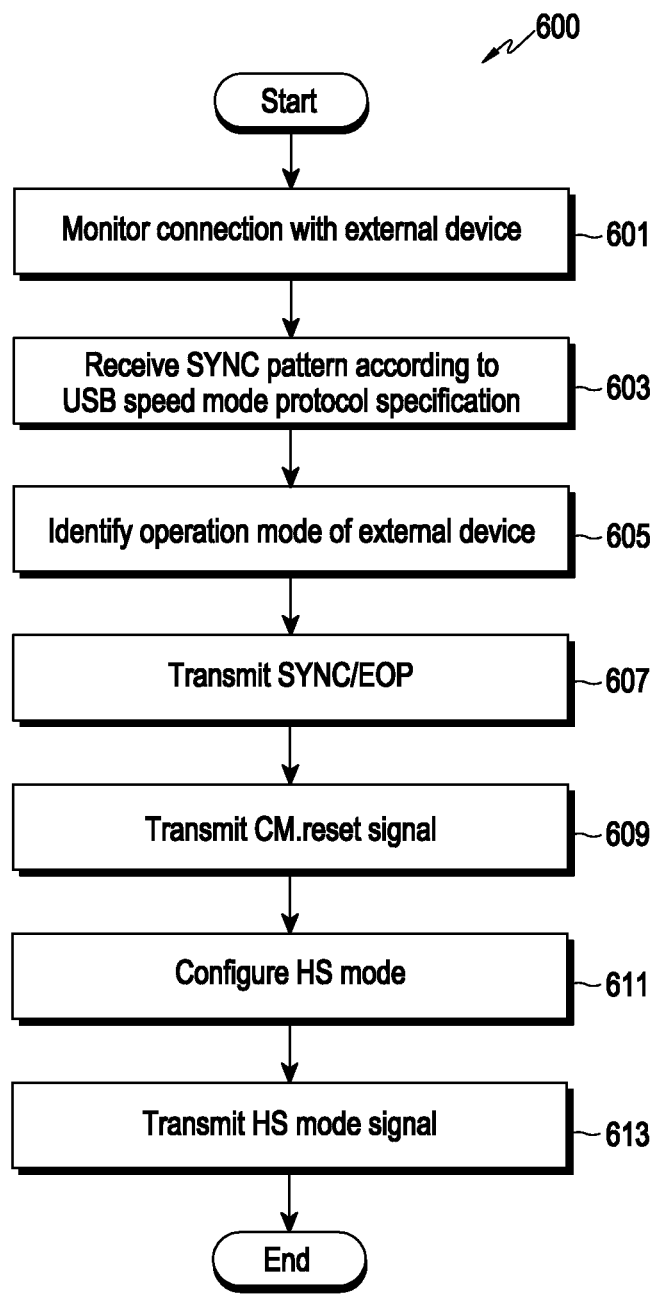
FIG. 6 is a flowchart illustrating a method of operation of an electronic device according to various embodiments.

FIG. 6 is a flowchart illustrating a method 600 of operation of an electronic device 201 according to various embodiments.

According to various embodiments, the electronic device 201 may operate in an HS/FS/LS mode upon supporting of an eUSB2 protocol, and an external device 202 connected to the electronic device 201 may operate in an HS mode or an FS/LS mode. FIG. 6 illustrates a method 600 of operation of the eUSB device 212, as an example, in a case where the external device 202 operates in the FS/LS mode.

The method 600 may include operations 601 to 613. Each operation of the method 600 of FIG. 6 may be performed by an electronic device (e.g., the electronic device 101 of FIG. 1 and the electronic device 201 of FIG. 2), at least one processor (e.g., at least one of the processor 120 of FIG. 1 or the processor 211 of FIG. 2) of the electronic device, or an eUSB device (e.g., 212 of FIG. 2) upon a control of a controller (not shown) included in the eUSB device (e.g., 212 of FIG. 2).

In operation 601, the electronic device 201 may monitor to detect a connection with the external device 202. According to an embodiment, after the detection of the connection with the external device 202, the electronic device 201 may identify whether a high or low signal according to toggling is detected in a state in which the high or low signal is fixed, so as to monitor the connection with the external device 202.

The electronic device 201 may receive, in operation 603, a signal having a pattern based on a specified protocol and a synchronous (SYNC) pattern, input from the external device 202, and identify, in operation 605, whether the operation mode of the external device 202 is an HS mode or an FS/LS mode. According to an embodiment, the signal input from the external device 202 may be transferred to the eUSB device (e.g., 212 of FIG. 2) through the repeater (e.g., 220 of FIG. 2). Different patterns of signals are transmitted according to the operation mode of the external device 202, and the electronic device 201 may determine the operation mode of the external device 202, based on the pattern of the signal received from the external device 202.

When the external device 202 is determined to operate in the HS mode, the electronic device 201 may operate according to the eUSB2 specification, and in FIG. 6, a description is made under the assumption that the external device 202 operates in the FS mode or the LS mode.

In operation 607, the electronic device 201 having identified that the operation mode of the external mode 202 is the FS/LS mode may be configured in a specified operation mode (speed mode) while a repeated exchange of an end-of-packet (EOP) pattern and a SYNC signal having a pattern corresponding to the operation mode of the external device 202 is performed through an HS transceiver (e.g., an HS transceiver 330 of FIG. 3B) of the eUSB device 212. For example, when the external device 202 operates in the FS mode, in a case of eD−, the toggle signal is transmitted as the SYNC signal according to a determined pattern while eD+ remains a predetermined voltage, and when the external device 202 operates in the LS mode, in a case of eD+, the toggle signal is transmitted as the SYNC signal according to a determined pattern while eD− remains a predetermined voltage.

In operation 609, the electronic device 201 may transmit a control message for allowing the eUSB2 device 222 of the repeater 220 to operate in the HS mode. For example, for the control message, a CM.reset message may be used according the eUSB2 specification.

In operation 611, after the CM.reset message is transmitted, the electronic device 201 may configure the operation methods of the eUSB device 212 and the eUSB2 device 222 of the repeater 220 as the HS mode.

In operation 613, after the completion of configuring the operation mode as the HS mode, the electronic device 201 may transmit and/or receive an FS/LS mode signal with the external device 202 through the repeater 222.

Figure 7:
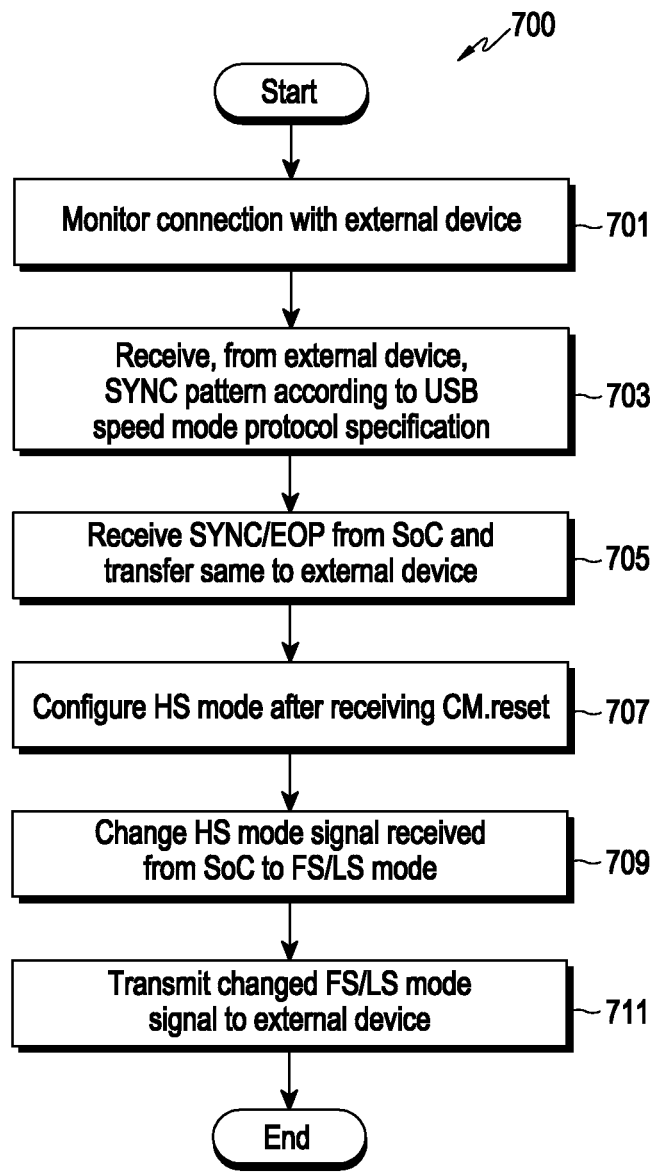
FIG. 7 is a flowchart illustrating a method of operation of an electronic device according to various embodiments.

FIG. 7 is a flowchart illustrating a method 700 of operation of an electronic device according to various embodiments.

According to various embodiments, an electronic device 201 may operate in an HS/FS/LS mode upon supporting of an eUSB2 protocol, and an external device 202 connected to the electronic device 201 may operate in an HS mode or an FS/LS mode. FIG. 7 illustrates an operation of a repeater 220, as an example, in a case where the external device 202 operates in the FS/LS mode.

The method 700 may include operations 701 to 711. Each operation of the method 700 of FIG. 7 may be performed by an electronic device (e.g., the electronic device 101 of FIG. 1 and the electronic device 201 of FIG. 2), at least one processor (e.g., at least one of the processor 120 of FIG. 1 or the processor 211 of FIG. 2) of the electronic device, or a repeater 210 upon a control of a controller (e.g., 221 of FIG. 2 and 423 of FIG. 4) included in the repeater (e.g., 220 of FIGS. 2 and 4).

In operation 701, the electronic device 201 may monitor to detect a connection with the external device 202 through an identification terminal included in a connector of the electronic device 201. According to an embodiment, after the detection of the connection with the external device 202, the electronic device 201 may identify whether a high or low signal according to toggling is detected in a state in which the high or low signal is fixed, so as to monitor the connection with the external device 202.

In operation 703, the electronic device 201 may receive a signal having a pattern based on a specified protocol and a synchronous (SYNC) pattern, input from the external device 202. According to an embodiment, the synchronous signal input from the external device 202 may be transferred to the eUSB device 212 through the repeater 220. Different patterns of signals are transmitted according to the operation mode of the external device 202, and the electronic device 201 may determine the operation mode of the external device 202, based on the pattern of the signal received from the external device 202.

When the external device 202 is determined to operate in the HS mode, the electronic device 201 may operate according to the eUSB2 specification, and accordingly, hereinafter, exemplary embodiments of the disclosure are described under the assumption that the external device 202 operates in the FS mode or the LS mode.

In operation 705, the electronic device 201 having identified that the operation mode of the external device 202 is the FS/LS mode may transmit, to the repeater 220 through an HS transceiver (e.g., an HS transceiver 330 of FIG. 3B) of the eUSB device 212, an end-of-packet (EOP) pattern and a SYNC signal having a pattern corresponding to the operation mode of the external device 202, and the repeater 220 may receive the corresponding signal and transfer the same to the external device 202. For example, when the external device 202 operates in the FS mode, in a case of eD−, the toggle signal is transmitted as the SYNC signal according to a determined pattern while eD+ remains a predetermined voltage, and when the external device 202 operates in the LS mode, in a case of eD+, the toggle signal is transmitted as the SYNC signal according to a determined pattern while eD− remains a predetermined voltage.

According to an embodiment, the signal output from the HS transceiver (e.g., the HS transceiver 330 of FIG. 3B) of the eUSB device 212 may be input to the eUSB2 device 421 of the repeater 220, and the repeater 220 may transfer the SYNC signal received through the HS transceiver (e.g., the HS transceiver 330 of FIG. 3B) of the eUSB device 421, through the USB2 device 422 of the repeater 220, and may receive the signal received from the external device 202. According to an embodiment, the signal may include a synchronous pattern, an SOP/EOP, etc. determined according to a protocol specification for each operation mode (speed mode) according to each USB operation speed.

In operation 707, the electronic device 201 may receive a CM.reset message transmitted from the eUSB device 212 from the eUSB2 device 421 of the repeater 220. For example, for the control message, the CM.reset message according the eUSB2 specification may be used. After receiving the CM.reset message, the electronic device 201 may configure the operation mode of the eUSB2 device 421 of the repeater 220 in the HS mode. According to an embodiment, the operation mode of the USB2 device of the repeater 220 may be maintained in the same manner as the operation mode of the external device 202.

In operation 709, after the completion of configuring the operation mode as the HS mode, the electronic device 201 may receive, from the eUSB2 device 421 of the repeater 220, the HS mode signal received from the eUSB device 212, transfer the received data to the USB2 device 422, based on the UTMI+ protocol, and change the corresponding data to the FS/LS mode in the controller 423.

In operation 711, the electronic device 201 may transmit the converted FS/LS mode signal to the external device 202 through the USB2 device 422.

Figure 8:
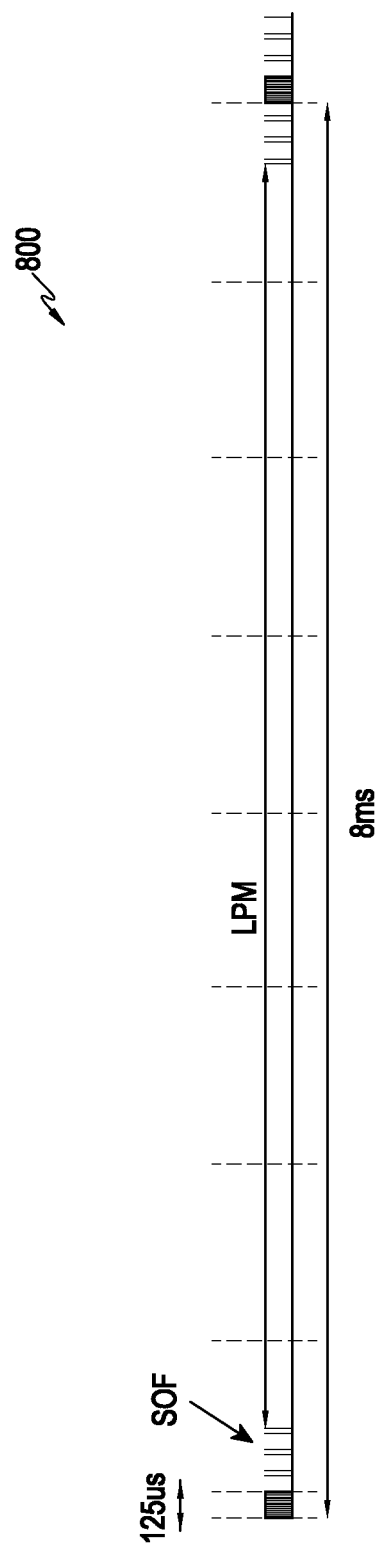
FIG. 8 illustrates a transmission interval of a signal transmitted in an HS mode in an electronic device according to various embodiments.

FIG. 8 illustrates a transmission interval 800 of a signal transmitted in an HS mode in an electronic device according to various embodiments.

According to an embodiment, the electronic device may change, to the HS mode, an operation mode of an eUSB2 device of a repeater connected to an eUSB device of an AP processor while maintaining an operation mode of a USB2 port of a repeater connected to an external device in an FS/LS mode according to an operation mode of the external device. Accordingly, as shown in FIG. 8, during a transmission interval of substantially 8 ms, an operation is performed in an activated state (for example, an L0 state) in which data is transmitted during substantially 125 us, and after the data is transmitted, a link power management (LPM)-L1 or L2 mode corresponding to a power saving mode is maintained during an interval remaining after excluding some time for which a start of frame (SOF) is transmitted, whereby power efficiency can be increased.

Figure 9:
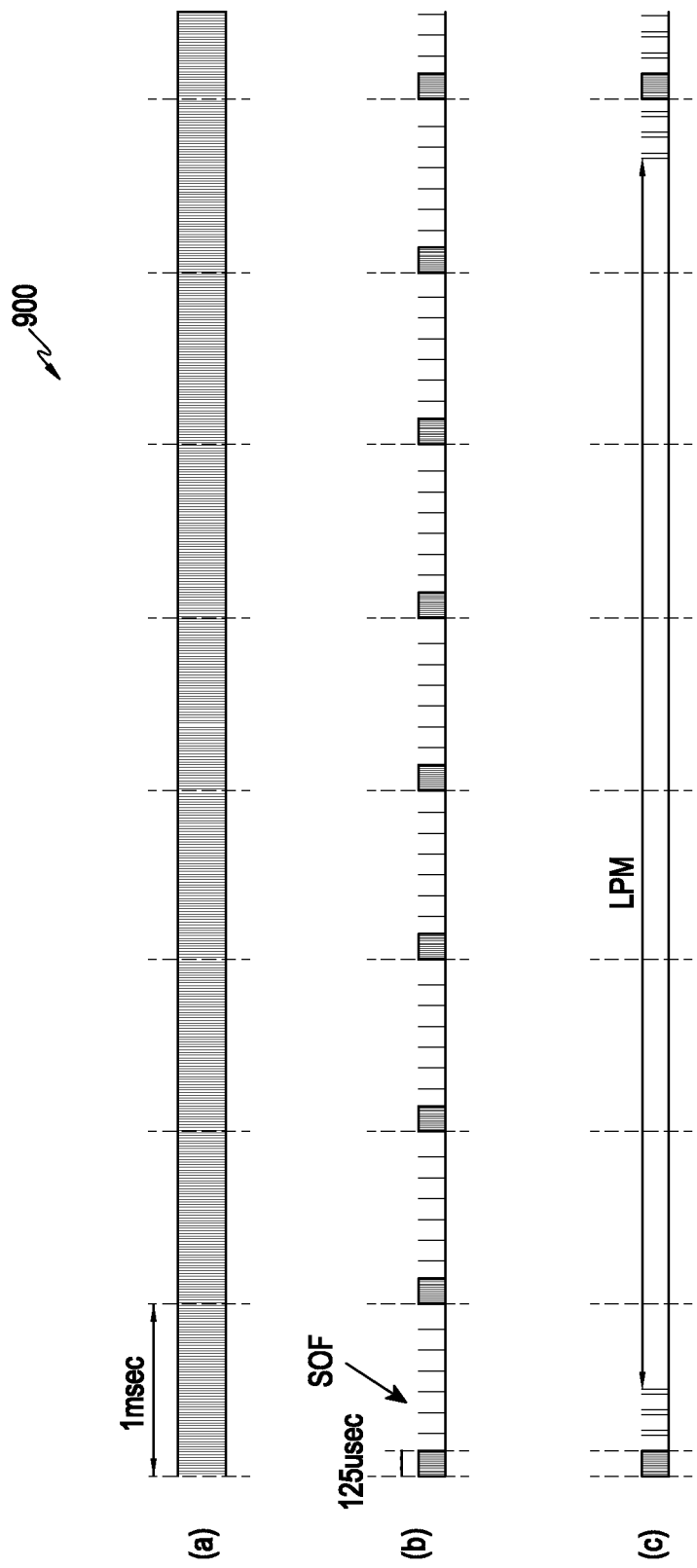
FIG. 9 illustrates comparison of transmission intervals, in which a signal is transmitted in HS/FS/LS modes, and power efficiency thereof in an electronic device according to various embodiments.

FIG. 9 illustrates comparison of transmission intervals 900, in which a signal is transmitted in HS/FS/LS modes, and power efficiency thereof in an electronic device according to various embodiments. A description of FIG. 9 is made under the assumption that an external device operates in an FS mode.

In FIG. 9, part (a) illustrates a case where a signal is transmitted between a repeater and an eUSB device of an electronic device in an FS mode according to the conventional technology, part (b) illustrates a case where a signal is transmitted between a repeater and an eUSB device of an electronic device in an HS mode but an LPM-L1 mode corresponding to a sleep mode is not applied, and part (c) illustrates a case where a signal is transmitted in an HS mode and an LPM-L1 is applied.

As shown in FIG. 9, in part (a), data is continuously transmitted over a transmission interval of substantially 8 ms, in part (b), data is periodically transmitted for substantially 125 us every substantially 1 ms, and in part (c), data is transmitted for substantially 125 us of substantially 8 ms and an LPM-L1/L2 mode is maintained for the most of the transmission interval, according to an embodiment of the disclosure. Accordingly, in part (c), about substantially 90 percent of a power efficient enhancement effect can be achieved, compared to part (a).

According to various embodiments, an operation method of an electronic device 201 includes: monitoring to detect a connection of an external device to the electronic device; identifying a mode related to an operation speed of the external device; and based on identification that the mode is a full speed (FS) mode or a low speed (LS) mode, controlling a signal to be transmitted or received in a high speed (HS) mode between a first embedded USB (eUSB) device configured to perform an eUSB function and a repeater configured to be electrically connectable between the first eUSB device and the external device, the first eUSB device and the repeater being included in the electronic device.

According to various embodiments, the repeater may include a second eUSB device connected to the first eUSB device, and a USB device configured to be connectable to the external device, wherein a signal is transmitted or received between the first eUSB device and the second eUSB device in the HS mode, and a signal is transmitted or received between the USB device and the external device in the identified FS mode or LS mode.

According to various embodiments, the method may further include: converting an HS mode signal transmitted from the first eUSB device to the repeater into a signal of the identified FS mode or LS mode, so as to transmit the same to the external device; and converting a signal received from the external device into the HS mode signal, so as to transfer the same to the first eUSB device, based on the identified FS mode or LS mode.

According to various embodiments, based on a USB transceiver microcell interface (UTMI)+ protocol, the HS mode signal transmitted from the first eUSB device to the repeater may be converted into a signal of the identified FS mode or LS mode, and the signal of the FS mode or LS mode, received from the external device, may be converted into the HS mode signal so that the signal is transferred to the first eUSB device.

According to various embodiments, the USB device may include a first transceiver configured to transmit and/or receive the signal of the FS mode or the LS mode, and a second transceiver configured to transmit and/or receive the HS mode signal, wherein each of the first eUSB device and the second eUSB device is configured not to include the first transceiver and is configured to include the second transceiver.

According to various embodiments, the method may include transmitting a synchronous signal corresponding to the identified FS mode or LS mode to the external device from the first eUSB device through the repeater, based on the identification that the mode is a full speed (FS) mode or a low speed (LS) mode.

According to various embodiments, the transmitting of the synchronous signal corresponding to the identified FS mode or LS mode may include transmitting, to the external device from the first eUSB device through the repeater, a synchronous signal corresponding to the identified FS mode or LS mode by using the second transceiver.

According to various embodiments, the identifying of the mode related to the operation speed of the external device may include identifying an operation speed of the external device, based on a pattern of a synchronous signal received from the external device.

According to various embodiments, the transmitting or receiving of the signal in the HS mode may include transmitting a predetermined control message to the first eUSB and the repeater to allow a signal to be transmitted or received between the first eUSB device and the repeater in the HS mode, based on the identification that the mode is an FS mode or an LS mode.

According to various embodiments, the HS mode may correspond to a mode of transmitting data during a first interval in which data is transmitted, and operating in a power saving mode during an interval remaining after excluding the first interval.

As described above, in an electronic device which supports an eUSB2 protocol and to which a repeater is applied, a signal is transmitted between an eUSB SoC and an eUSB2 port of the repeater always in an HS mode, regardless of an operation mode of an external device, whereby power efficiency can be increased. In addition, a signal is transmitted between the eUSB SoC and the eUSB2 port of the repeater always in the HS mode, and thus, in configuration of a circuit of the eUSB SoC and the eUSB2 port of the repeater, the circuit can be simplified through omission of an FS/LS transceiver.

One or more embodiments of the invention are described with reference to the accompanying drawings, in which various embodiments are shown. One or more embodiments may, however, be embodied in many different forms, and should not be construed as limited to the embodiments set forth herein. Rather, these embodiments are provided so that this disclosure will be thorough and complete, and will fully convey the scope of embodiments of the invention to those skilled in the art.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
an application processor internally comprising both a first embedded universal serial bus (eUSB) device configured to perform an eUSB function, and a processor configured to control the first eUSB device;
a repeater configured to be electrically connectable between the first eUSB device and an external device; and
an identification circuit separately coupled to the application processor, the repeater, and the external device;
wherein the processor is configured to:
monitor to detect a connection of the external device to the electronic device,
identify a mode related to an operation speed of the external device, and
based on the identification that the mode is a full speed (FS) mode or a low speed (LS) mode, control a first signal to be transmitted or received in a high speed (HS) mode between the first eUSB device and the repeater by controlling the repeater to operate in the HS mode through a reset signal and a second signal to be transmitted or received between the repeater and the external device in the identified FS mode or LS mode.

2. The electronic device of claim 1, wherein the repeater comprises a second eUSB device connected to the first eUSB device, and a USB device configured to be connectable to the external device, and
wherein the processor is further configured to:
allow the first signal to be transmitted or received between the first eUSB device and the second eUSB device in the HS mode, and
allow the second signal to be transmitted or received between the USB device and the external device in the identified FS mode or LS mode.

3. The electronic device of claim 1, wherein the processor is further configured to control the repeater to:
convert an HS mode signal transmitted from the first eUSB device to the repeater into the second signal of the identified FS mode or LS mode, and transmit the converted second signal to the external device, and
convert the second signal received from the external device into the HS mode signal, and transfer the converted HS mode signal to the first eUSB device, based on the identified FS mode or LS mode.

4. The electronic device of claim 3, wherein the processor is further configured to control the repeater to:
based on a USB transceiver microcell interface (UTMI)+ protocol, convert the HS mode signal transmitted from the first eUSB device to the repeater into the second signal of the identified FS mode or LS mode, convert the second signal of the FS mode or LS mode, received from the external device, into the HS mode signal, and transfer the same to the first eUSB device.

5. The electronic device of claim 2, wherein the USB device comprises a first transceiver configured to transmit or receive the second signal of the FS mode or the LS mode, and a second transceiver configured to transmit or receive the HS mode signal,
wherein each of the first eUSB device and the second eUSB device is configured not to comprise the first transceiver and is configured to comprise the second transceiver.

6. The electronic device of claim 5, wherein the processor is further configured to transmit, to the external device from the first eUSB device through the repeater, a synchronous signal corresponding to the identified FS mode or LS mode, based on the identification that the mode is the FS mode or the LS mode.

7. The electronic device of claim 6, wherein the processor is further configured to transmit, to the external device from the first eUSB device through the repeater, a synchronous signal corresponding to the identified FS mode or LS mode by using the second transceiver.

8. The electronic device of claim 1, wherein the processor is further configured to identify the mode related to the operation speed of the external device, based on a pattern of a synchronous signal received from the external device.

9. The electronic device of claim 1, wherein the processor is further configured to transmit a predetermined control message to the first eUSB and the repeater to allow the first signal to be transmitted or received between the first eUSB device and the repeater in the HS mode, based on the identification that the mode is the FS mode or the LS mode.

10. The electronic device of claim 1, wherein the HS mode corresponds to a mode of transmitting data during a first interval in which data is transmitted, and operating in a power saving mode during an interval remaining after excluding the first interval.

11. An operation method of an electronic device, the method comprising:
monitoring to detect a connection of an external device to the electronic device, the electronic device including an application processor internally comprising both a first embedded universal serial bus (eUSB) device and a processor, wherein the electronic device includes an identification circuit separately coupled to the application processor, the repeater, and the external device;

identifying a mode related to an operation speed of the external device; and based on the identification that the mode is a full speed (FS) mode or a low speed (LS) mode, allowing a first signal to be transmitted or received in a high speed (HS) mode between a first eUSB device configured to perform an eUSB function and a repeater configured to be electrically connectable between the first eUSB device and the external device by controlling the repeater to operate in the HS mode through a reset signal, the first eUSB device and the repeater being included in the electronic device, and allowing a second signal to be transmitted or received in the identified FS mode or LS mode between the repeater and the external device.

12. The method of claim 11, wherein the repeater comprises a second eUSB device connected to the first eUSB device, and a USB device configured to be connectable to the external device, wherein the first signal is transmitted or received between the first eUSB device and the second eUSB device in the HS mode, and wherein the second signal is transmitted or received between the USB device and the external device in the identified FS mode or LS mode.

13. The method of claim 11, further comprising:

converting an HS mode signal transmitted from the first eUSB device to the repeater into the second signal of the identified FS mode or LS mode, and transmitting the converted second signal to the external device; and converting the first signal received from the external device into the HS mode signal, and transferring the converted first signal to the first eUSB device, based on the identified FS mode or LS mode.

14. The method of claim 13, wherein based on a USB transceiver microcell interface (UTMI)+ protocol, the HS mode signal transmitted from the first eUSB device to the repeater is converted into the second signal of the identified FS mode or LS mode, and the second signal of the FS mode or LS mode, received from the external device, is converted into the HS mode signal so that the HS mode signal is transferred to the first eUSB device.

15. The method of claim 12, wherein the USB device comprises a first transceiver configured to transmit or receive the second signal of the FS mode or the LS mode, and a second transceiver configured to transmit or receive the HS mode signal, wherein each of the first eUSB device and the second eUSB device is configured not to comprise the first transceiver and is configured to comprise the second transceiver.

16. The method of claim 15, comprising transmitting a synchronous signal corresponding to the identified FS mode or LS mode to the external device from the first eUSB device through the repeater, based on the identification that the mode is the FS mode or the LS mode, wherein the transmitting of the synchronous signal corresponding to the identified FS mode or LS mode comprises transmitting, to the external device from the first eUSB device through the repeater, a synchronous signal corresponding to the identified FS mode or LS mode by using the second transceiver.

17. The method of claim 11, wherein the identifying of the mode related to the operation speed of the external device comprises identifying the operation speed of the external device, based on a pattern of a synchronous signal received from the external device.

18. The method of claim 11, wherein the transmitting or receiving of the signal in the HS mode comprises transmitting a predetermined control message to the first eUSB and the repeater to allow the first signal to be transmitted or received between the first eUSB device and the repeater in the HS mode, based on the identification that the mode is the FS mode or the LS mode.

19. The method of claim 11, wherein the HS mode corresponds to a mode of transmitting data during a first interval in which data is transmitted, and operating in a power saving mode during an interval remaining after excluding the first interval.

20. A method comprising:

monitoring, by an electronic device, to detect a connection with an external device through an identification terminal included in a connector of an electronic device;

receiving, from the external device, a signal having a pattern based on a specified protocol and a synchronous (SYNC) pattern;

responsive to identifying that a mode of the external device is one of a full speed (FS) mode or a low speed (LS) mode, transmitting, from the electronic device to the external device, an end-of-packet pattern and a SYNC signal having a pattern corresponding to the mode of the external device;

responsive to receiving a reset signal, configuring, by the electronic device, an operation mode of an embedded USB (eUSB) device to operate in the HS mode between the eUSB and a repeater, wherein the electronic device includes an application processor internally comprising both the eUSB device and a processor configured to control the eUSB device, and wherein the electronic device includes an identification circuit separately coupled to the application processor, the repeater, and the external device;

converting, by the electronic device, a received HS mode signal to an FS mode signal or an LS mode signal based on the mode of the external device; and transmitting, by the electronic device, the FS mode signal or the LS mode signal to the external device.

* * * * *